(12) United States Patent
Jung (10) Patent No.: US 12,110,029 B2
(45) Date of Patent: Oct. 8, 2024

(54) APPARATUS AND METHOD FOR CONTROLLING DRIVING OF VEHICLE

(71) Applicants: HYUNDAI MOTOR COMPANY, Seoul (KR); KIA CORPORATION, Seoul (KR)

(72) Inventor: Chan Hee Jung, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 251 days.

(21) Appl. No.: 17/331,052

(22) Filed: May 26, 2021

(65) Prior Publication Data
US 2022/0144286 A1 May 12, 2022

(30) Foreign Application Priority Data

Nov. 6, 2020 (KR) .................. 10-2020-0147775

(51) Int. Cl.
*B60W 40/105* (2012.01)
*B60W 30/14* (2006.01)
*B60W 30/16* (2020.01)

(52) U.S. Cl.
CPC ........ *B60W 40/105* (2013.01); *B60W 30/143* (2013.01); *B60W 30/16* (2013.01);
(Continued)

(58) Field of Classification Search
CPC .. B60W 40/105; B60W 30/143; B60W 30/16; B60W 2552/00; B60W 2552/40;
(Continued)

(56) References Cited

U.S. PATENT DOCUMENTS

| 6,696,929 B2 * | 2/2004 | Igaki | .................. B60K 31/0008 |
| | | | 340/904 |
| 2006/0229792 A1 * | 10/2006 | Kawazoe | .............. B60W 40/04 |
| | | | 701/532 |

(Continued)

FOREIGN PATENT DOCUMENTS

| CN | 108334055 A * | 7/2018 | ......... G05B 23/0256 |
| KR | 102201384 B1 * | 1/2021 | .......... B60W 30/143 |

OTHER PUBLICATIONS

Kim et al., KR102201384B1_Machine Translation, 2021 (Year: 2021).*
Zhao, CN108334055A_Machine Translation, 2018 (Year: 2018).*

*Primary Examiner* — Jelani A Smith
*Assistant Examiner* — Alyssa Rorie
(74) *Attorney, Agent, or Firm* — Lempia Summerfield Katz LLC (57) ABSTRACT

Disclosed are an apparatus and a method for controlling driving of a vehicle. The apparatus includes a sensor that obtains information about an external environment of the vehicle, and a controller that calculates a target driving speed based on at least one of weather information, road surface information, or a minimum sensing distance detectable by the sensor, and sets a preset driving speed as the target driving speed. Accordingly, the driving of the vehicle is controlled by accurately reflecting external environment information and setting the target driving speed of the vehicle, so that it is possible to minimize user anxiety about the stability of autonomous driving and reduce the risk of an accident.

18 Claims, 8 Drawing Sheets

(52) U.S. Cl.
CPC ..... *B60W 2552/00* (2020.02); *B60W 2552/40* (2020.02); *B60W 2554/802* (2020.02); *B60W 2555/20* (2020.02)

(58) Field of Classification Search
CPC ....... B60W 2555/20; B60W 2554/802; B60W 60/0015; B60W 30/0956; B60W 2556/35; B60W 2720/10; B60W 60/0016; B60W 2520/10; B60W 10/18; B60W 40/02; B60W 60/001; B60W 2420/52; B60W 2420/54; B60W 2420/408; B60Y 2300/143
See application file for complete search history.

(56) References Cited

U.S. PATENT DOCUMENTS

| | | | |
|---|---|---|---|
| 2009/0005945 A1* | 1/2009 | Takeda | B60W 30/18145 701/70 |
| 2009/0240398 A1* | 9/2009 | Nanami | B60W 40/04 701/41 |
| 2011/0320102 A1* | 12/2011 | Ohbayashi | B60W 30/143 701/93 |
| 2015/0151756 A1* | 6/2015 | Han | B60W 30/18145 701/93 |
| 2020/0384999 A1* | 12/2020 | Ohmura | B60W 30/0956 |
| 2021/0024085 A1* | 1/2021 | Kitagawa | B60W 30/10 |
| 2021/0078575 A1* | 3/2021 | Machida | B60W 50/082 |
| 2021/0114620 A1* | 4/2021 | Yu | B60W 60/0025 |
| 2021/0269062 A1* | 9/2021 | Yasutomi | G06T 7/50 |
| 2022/0194425 A1* | 6/2022 | Pöllny | B60W 30/14 |
| 2023/0137313 A1* | 5/2023 | Schoenherr | B60W 50/14 701/93 |

* cited by examiner

APPARATUS AND METHOD FOR CONTROLLING DRIVING OF VEHICLE

CROSS-REFERENCE TO RELATED APPLICATION

This application claims priority to and the benefit of Korean Patent Application No. 10-2020-0147775, filed on Nov. 6, 2020, the entire contents of which are incorporated herein by reference.

FIELD

The present disclosure relates to an apparatus and a method for controlling driving of a vehicle.

BACKGROUND

The statements in this section merely provide background information related to the present disclosure and may not constitute prior art.

An autonomous vehicle refers to a vehicle that is driven by setting a target speed based on external environment information, GPS information, map database, and vehicle driving information, and automatically controls braking and steering. In particular, it is very important to accurately detect external environment information in order for the autonomous vehicle to automatically control driving, braking, and steering of the vehicle.

However, we have found that an accident may occur when the function of a sensor is degraded and thus the sensor provides inaccurate information, or when the target speed is set based on the inaccurate external environment information of a vehicle.

SUMMARY

The present disclosure has been made to solve the above-mentioned problems occurring in the prior art while advantages achieved by the prior art are maintained intact.

An aspect of the present disclosure provides an apparatus and a method for controlling driving of a vehicle capable of accurately determining an external environment to set a target driving speed of an autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle may include: a sensor that obtains external environment information of the vehicle, wherein the obtained external environment information includes weather information and road surface information of a road on which the vehicle is traveling; and a controller that calculates a target driving speed based on at least one of the weather information, the road surface information, or a minimum sensing distance detectable by the sensor, and sets a preset driving speed as the target driving speed.

The controller may calculate a first target speed based on a preset weather coefficient based on the weather information and the preset driving speed.

The controller may calculate a required braking distance based on a friction coefficient corresponding to the road surface information, the preset driving speed, and a gravitational acceleration.

The controller may calculate a second target speed based on the required braking distance when the friction coefficient is less than the friction coefficient corresponding to the road surface information.

The controller may calculate a margin distance based on the minimum sensing distance of the sensor and a preset deceleration.

The controller may calculate a third target speed based on the margin distance when the minimum sensing distance of the sensor is less than a previously detected minimum sensing distance.

The controller may calculate a minimum value of the first target speed, the second target speed, and the third target speed as the target driving speed.

The controller may calculate the target driving speed based on a minimum value of the second target speed and the third target speed.

The controller may calculate the third target speed as the target driving speed.

According to an aspect of the present disclosure, a method of controlling driving of a vehicle may include: obtaining, by a sensor, external environment information of the vehicle, wherein the obtained external environment information includes weather information and road surface information of a road on which the vehicle is traveling; calculating, by a controller, a target driving speed based on at least one of the weather information, the road surface information, or a minimum sensing distance detectable by the sensor; and setting, by the controller, a preset driving speed as the target driving speed.

The calculating of the target driving speed may include calculating a first target speed based on a preset weather coefficient based on the weather information and the preset driving speed.

The calculating of the target driving speed may include calculating a required braking distance based on a friction coefficient corresponding to the road surface information, the preset driving speed, and gravitational acceleration.

The calculating of the target driving speed may include calculating a second target speed based on the required braking distance when the friction coefficient is less than the friction coefficient corresponding to the road surface information previously obtained.

The calculating of the target driving speed may include calculating a margin distance based on the minimum sensing distance of the sensor and a preset deceleration.

The calculating of the target driving speed may include calculating a third target speed based on the margin distance when the minimum sensing distance of the sensor is less than a previously detected minimum sensing distance.

The calculating of the target driving speed may include calculating a minimum value of the first target speed, the second target speed, and the third target speed as the target driving speed.

The calculating of the target driving speed may include calculating the target driving speed based on a minimum value of the second target speed and the third target speed.

The calculating of the target driving speed may include calculating the third target speed as the target driving speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the forms of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
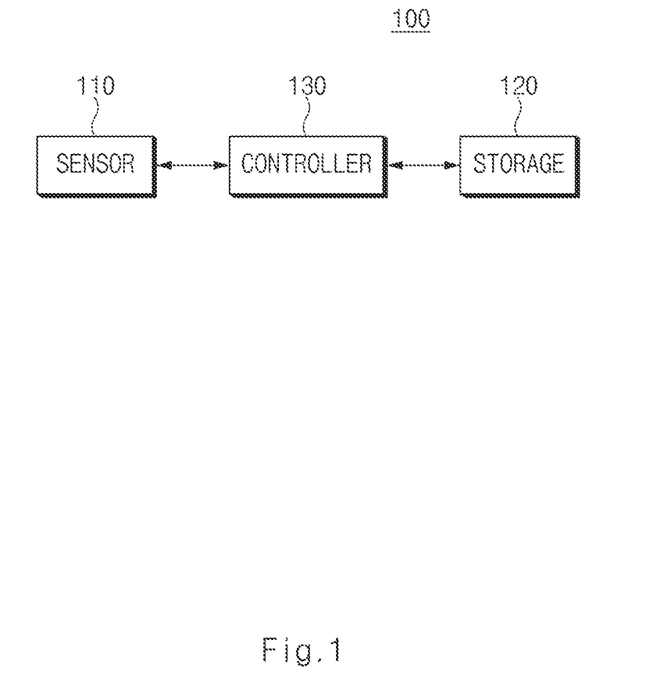
FIG. 1 is a block diagram illustrating a configuration of an apparatus for controlling driving of a vehicle according to an exemplary form of the present disclosure.

FIG. 1 is a block diagram illustrating a configuration of an apparatus for controlling driving of a vehicle according to an exemplary form of the present disclosure.

As shown in FIG. 1, an apparatus 100 for controlling driving of a vehicle in one form of the present disclosure may include a sensor 110, storage 120, and a controller 130.

The sensor 110 may obtain external environment information of a vehicle. According to one form, the sensor 110 may obtain weather information and road surface information of a road on which the vehicle is travelling. To this end, the sensor 110 may include an image sensor, an illuminance sensor, a rain sensor, and the like. In addition, the sensor 110 may detect an obstacle in front of the vehicle. To this end, the sensor 110 may include a radar sensor, a lidar sensor, an ultrasonic sensor, and the like.

The storage 120 may store at least one algorithm that performs operations or executions of various commands for the operation of an apparatus for controlling driving of a vehicle according to an exemplary form of the present disclosure. The storage 120 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 130 may be implemented with various processing devices such as a microprocessor including a semiconductor chip capable of performing operation or execution of various commands, and control the operation of the apparatus for controlling driving of a vehicle according to an exemplary form of the present disclosure. In detail, a target driving speed may be calculated based on at least one of weather information or road surface information included in the external environment information obtained by the sensor 110, and a minimum sensing distance detectable by the sensor 110, and a preset driving speed may be changed to the target driving speed.

According to another form of the present disclosure, the controller 130 may calculate a first target speed based on a preset weather coefficient and a preset driving speed based on weather information. The details will be described with reference to FIG. 2.

Figure 2:
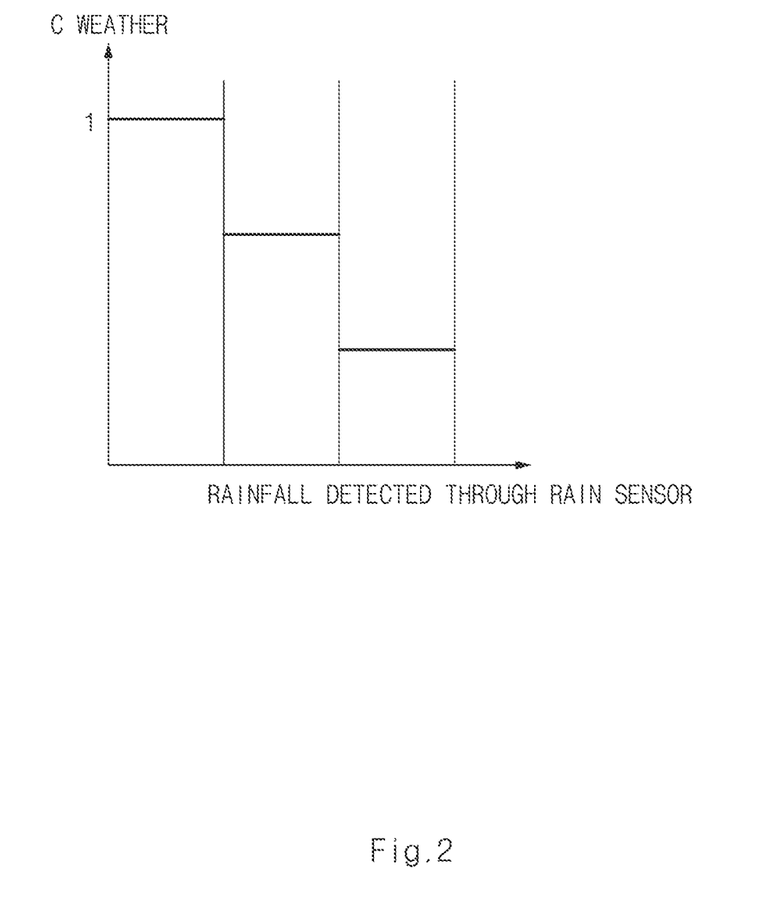
FIG. 2 is a graph illustrating a weather coefficient corresponding to a weather factor according to one form of the present disclosure.

FIG. 2 is a graph illustrating a weather coefficient corresponding to a weather factor according to one form of the present disclosure.

As illustrated in FIG. 2, the controller 130 may set the weather coefficient corresponding to the weather information. The controller 130 may set the weather coefficient based on a rainfall detected by a rain sensor, where the weather coefficient may be inversely proportional to the rainfall. For example, when the rainfall is '0' (zero), the weather coefficient may be '1'. The weather coefficient may decrease from 1 as the rainfall increases, and may increase closer to weather coefficient '1' as the rainfall decreases.

As described above, the controller 130 may calculate a first target speed by multiplying a preset weather coefficient and a preset driving speed. That is, the controller 130 may calculate the first target speed as a preset driving speed in the case of sunny weather with zero rainfall, and may calculate the first target speed by multiplying the preset driving speed by the weather coefficient set corresponding to the rainfall in rainy weather. For example, when the weather coefficient set according to the rainfall is 0.8 and the preset driving speed is 60 km/h, the first target speed may be calculated as 48 km/h.

The controller 130 may set a friction coefficient corresponding to the road surface information, and calculate a required braking distance based on the friction coefficient, the preset driving speed, and gravitational acceleration. The controller 130 may set the friction coefficient to a larger value as the friction force of the road surface increases, and may set the friction coefficient to a smaller value as the friction force of the road surface decreases.

In addition, when the friction coefficient is less than the friction coefficient corresponding to the previously obtained road surface information, the controller 130 may calculate the second target speed based on the required braking distance. See FIGS. 3A and 3B for a more detailed description.

Figure 3A:
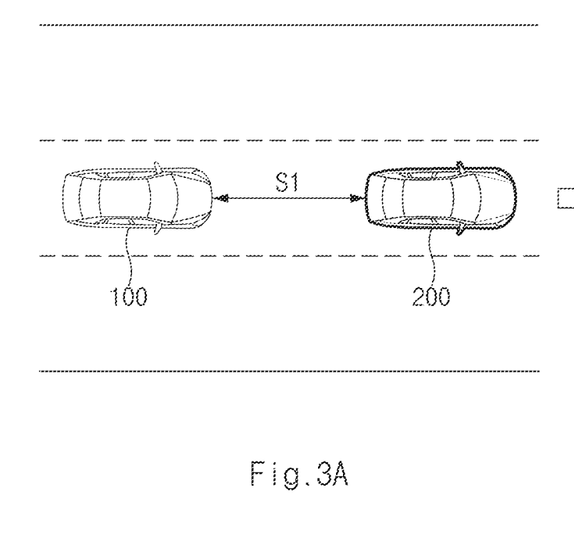
FIG. 3A is a diagram illustrating a required braking distance calculated based on road surface information obtained in advance.
Figure 3B:
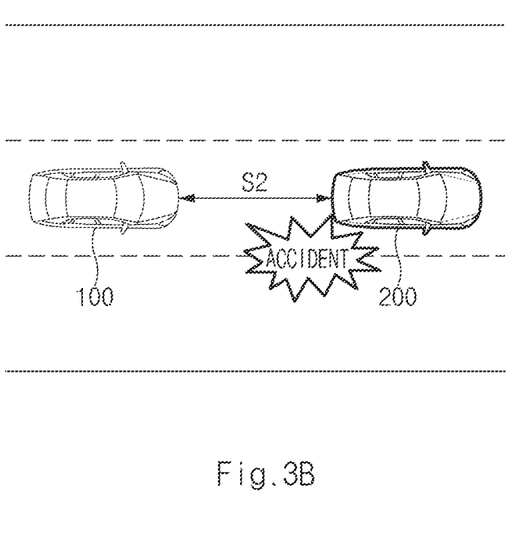
FIG. 3B is a diagram schematically illustrating a required braking distance changed.

FIG. 3A is a diagram illustrating a required braking distance calculated based on road surface information obtained in advance. FIG. 3B is a diagram schematically illustrating a required braking distance changed.

When the required braking distance is increased to S2 due to a change in the friction coefficient as shown in FIG. 3B after the controller 130 calculates a required braking distance S1 calculated based on the friction coefficient corresponding to the road surface information obtained in advance by the sensor 110 as shown in FIG. 3A, the controller 130 may calculate the second target speed because an accident with a forward vehicle 200 is expected.

According to another form of the present disclosure, the controller 130 may calculate the second target speed for moving the same required braking distance when the friction coefficient is changed by using following Equation 1 based on the braking force and kinetic energy.

$$W=FS=m*\mu*g*\text{Required braking distance}=[m*\text{Driving Speed}^2]/2 \quad \text{<Equation 1>}$$

(where g is gravitational acceleration of 9.81 m/s$^2$, and µ is a friction coefficient)

For example, when the driving speed is 60 km/h and the friction coefficient is '1', the controller 130 may calculate the required braking distance as about 14.178 m. According to one form of the present disclosure, the controller 130 may set a margin distance to secure a distance to a forward vehicle, and may set a value obtained by adding the margin distance to the required braking distance as a target braking distance.

When the friction coefficient of a road is reduced to 0.7 and the same required braking distance must be moved, the controller 130 may calculate the driving speed as about 50.23 km/h, and calculate the calculated driving speed as the second target speed. That is, when the friction coefficient of the road decreases from 1 to 0.7 while the distance to the forward vehicle is constant, the controller 130 may set the second target speed of the vehicle to 50.23 km/h.

According to another form of the present disclosure, the controller 130 may calculate the margin distance based on the minimum sensing distance detected by the sensor 110 and a preset deceleration. The controller 130 may set the minimum sensing distance as illustrated in FIG. 4.

Figure 4:
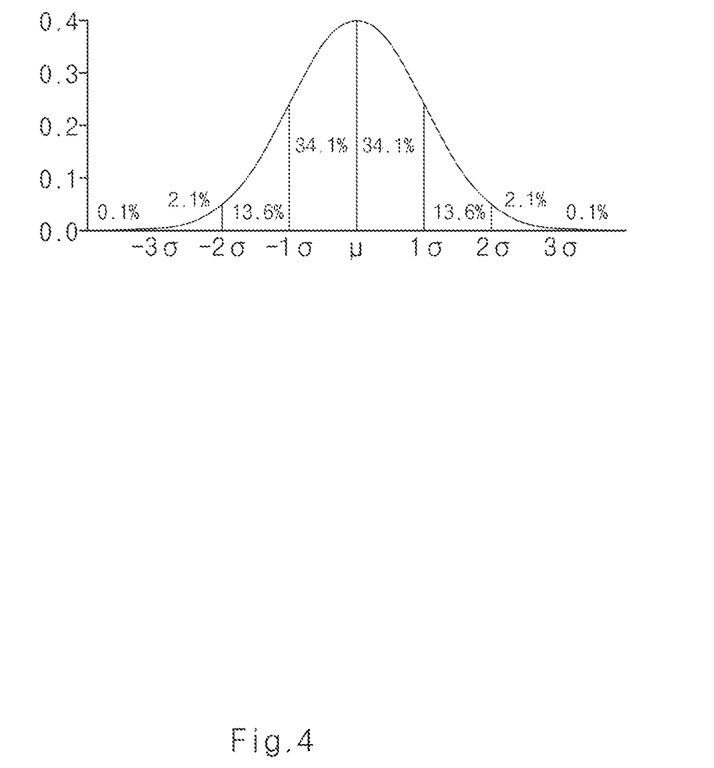
FIG. 4 is a graph illustrating a probability of detecting a location of an obstacle in front of a vehicle according to an exemplary form of the present disclosure.

FIG. 4 is a graph illustrating a probability of detecting a location of an obstacle in front of a vehicle according to one form of the present disclosure.

As shown in FIG. 4, the controller 130 may set the minimum sensing distance based on a probability of detecting a location where an obstacle exists in front of the vehicle. The controller 130 may fuse data obtained through at least one sensor and detect a distance to an obstacle in front of the vehicle based on the fused data. As an example, the controller 130 may set, as the minimum sensing distance, a distance to an obstacle located at the maximum distance among obstacles having a probability that the at least one sensor detects a plurality of obstacles in front of the vehicle and that is equal to or greater than a specified probability (e.g., 1σ (68%) of FIG. 4), based on the fused data. When the minimum sensing distance is set, the controller 130 may calculate a margin distance that allows the vehicle to decelerate in advance without decelerating until the vehicle reaches the obstacle by using Equation 2 based on the final speed, driving speed, and deceleration. In this case, the deceleration may be preset to prevent unnecessary emergency braking of the vehicle. According to one form of the present disclosure, the deceleration may include the maximum deceleration required for normal driving.

$$\text{Maximum Speed}^2-\text{Driving Speed}^2=2*\text{Deceleration}*(\text{Minimum Sensing Distance}-\text{Margin Distance}) \quad \text{<Equation 2>}$$

For example, when the final speed is '0', the driving speed is 60 km/h, the minimum sensing distance is 46 m, and the deceleration is −5 m/s$^2$, the margin distance may be calculated as about 18 m.

When the minimum sensing distance detected through the sensor 110 is less than the minimum sensing distance sensed in advance, the controller 130 may calculate a third target speed based on the changed minimum sensing distance and the margin distance. The details will be described with reference to FIGS. 5A and 5B.

Figure 5A:
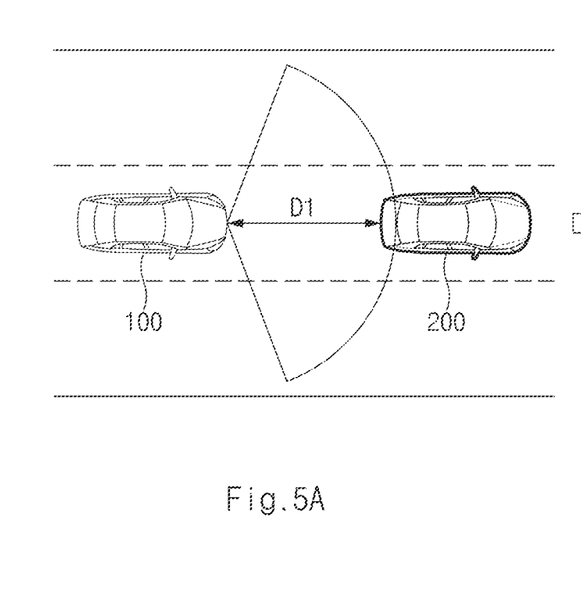
FIG. 5A is a diagram illustrating the minimum sensing distance to an obstacle detected in advance by a sensor.
Figure 5B:
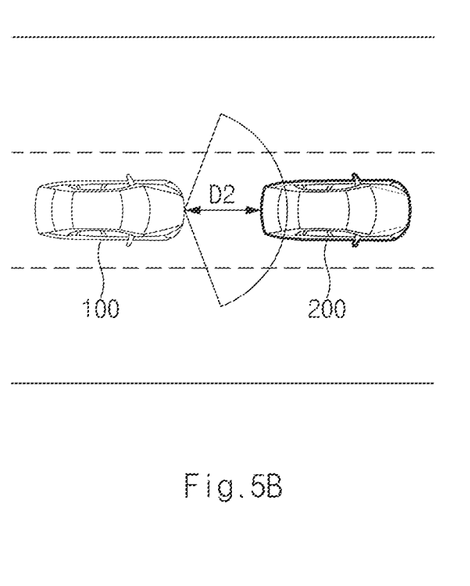
FIG. 5B is a diagram illustrating the minimum sensing distance after the minimum sensing distance of a sensor is changed.

FIG. 5A is a diagram illustrating the minimum sensing distance to an obstacle detected in advance by a sensor. FIG. 5B is a diagram illustrating the minimum sensing distance after the minimum sensing distance of a sensor is changed.

When the minimum sensing distance to the obstacle detected in advance is D1 as shown in FIG. 5A, and the performance of the sensor is deteriorated so that the minimum sensing distance is changed to D2 as shown in FIG. 5B, the controller 130 may calculate the third target speed based on the changed minimum sensing distance.

According to one form of the present disclosure, when the margin distance is constant, the controller 130 may calculate the driving speed by using Equation 2. For example, when the final speed is '0' (zero), the minimum sensing distance is 35 m, and the margin distance is 18 m, the controller 130 may consider that the distance to the obstacle is not 35 m ahead but 17 m ahead and calculate the driving speed. The controller 130 may calculate the driving speed of about 46.93 km/h by using Equation 2. That is, when the minimum sensing distance decreases from 46 m to 35 m while the margin distance is constant, the controller 130 may set the third target speed of the vehicle to 46.93 km/h. Accordingly, the controller 130 may prevent unnecessary emergency braking and easily set the target driving speed of the vehicle corresponding to the sensor sensing distance.

Figure 6:
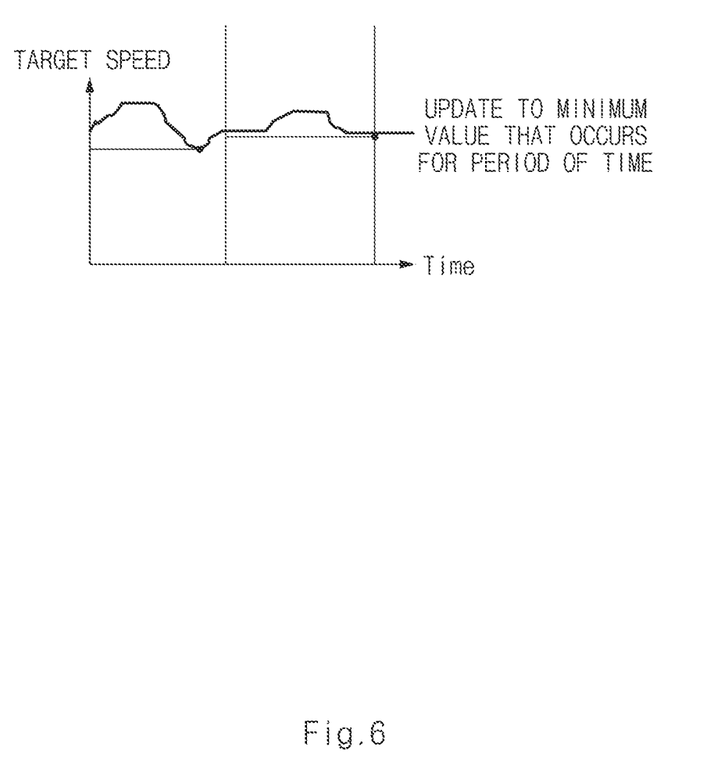
FIG. 6 is a diagram schematically illustrating an update period of a target driving speed calculated according to an exemplary form of the present disclosure.

FIG. 6 is a diagram schematically illustrating an update period of a target driving speed calculated according to another form of the present disclosure.

According to one form of the present disclosure, when the weather coefficient is continuously changed due to the change of the weather, the friction coefficient is continuously changed due to the change of the road surface information, the performance of the sensor is changed, and the minimum sensing distance is continuously changed, the target driving speed is also frequently changed correspondingly. Accordingly, as shown in FIG. 6, the controller 130 may update the minimum value of the target speeds acquired for a specified time to the target driving speed. However, the forms are not limited thereto, and the controller 130 may update the average value of the target driving speed acquired for a predetermined time to the target driving speed or the maximum value to the target driving speed.

In addition, when the amount of change in the target driving speed is equal to or greater than a specified value, the controller 130 may update the target driving speed. That is, the controller 130 may update the target driving speed only when the target driving speed changes above a specified value, so that the target driving speed is prevented from continuously changing with a change amount less than the specified value, thereby minimizing the inconvenience of the driver.

Figure 7:
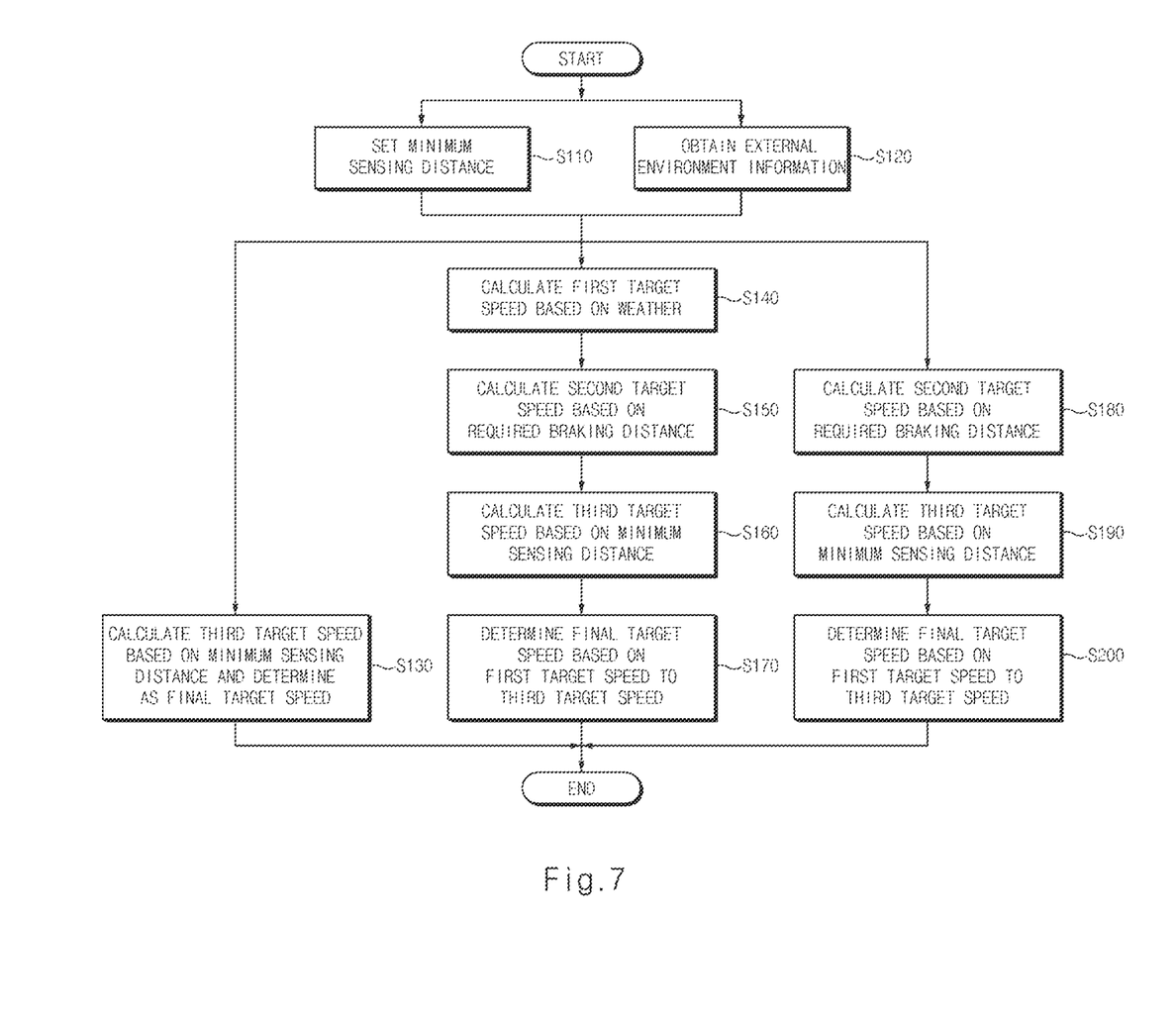
FIG. 7 is a flowchart illustrating a method of controlling driving of a vehicle according to another form of the present disclosure.

FIG. 7 is a flowchart illustrating a method of controlling driving of a vehicle according to another form of the present disclosure.

As shown in FIG. 7, in step S110, the controller 130 may set the minimum sensing distance to a front obstacle. In step S110, the controller 130 may set the minimum sensing distance based on a probability of detecting a location where an obstacle exists in front of the vehicle. See FIG. 4 for a more detailed description.

In addition, the controller 130 may obtain external environment information in step S120. In step S120, the controller 130 may obtain weather information and road surface information.

In step S140, the controller 130 may calculate the first target speed by using a weather coefficient set corresponding to the weather information, based on the weather information obtained in step S120. In addition, in step S150, the controller 130 may calculate the required braking distance by using the friction coefficient corresponding to the road surface information based on the road surface information obtained in step S120, and calculate the second target speed based on the required braking distance. In addition, in step S160, the controller 130 may calculate the third target speed based on the minimum sensing distance set in step S110. According to another form of the present disclosure, in step S170, the controller 130 may calculate the minimum value among the first target speed to the third target speed calculated in steps S140 to S160 as the final target driving speed.

According to another form, the controller 130 may calculate the third target speed based on the minimum sensing distance set in step S110 and determine the third target speed as the final target driving speed.

According to still another form, in step S180, the controller 130 may calculate the required braking distance by using the friction coefficient corresponding to the road surface information obtained in step S120, and calculate the second target speed based on the required braking distance. In addition, in step S190, the controller 130 may calculate the third target speed based on the minimum sensing distance set in step S110. In addition, in step S200, the minimum value of the second target speed and the third target speed obtained in steps S180 to S190 may be calculated as the final target driving speed.

Figure 8:
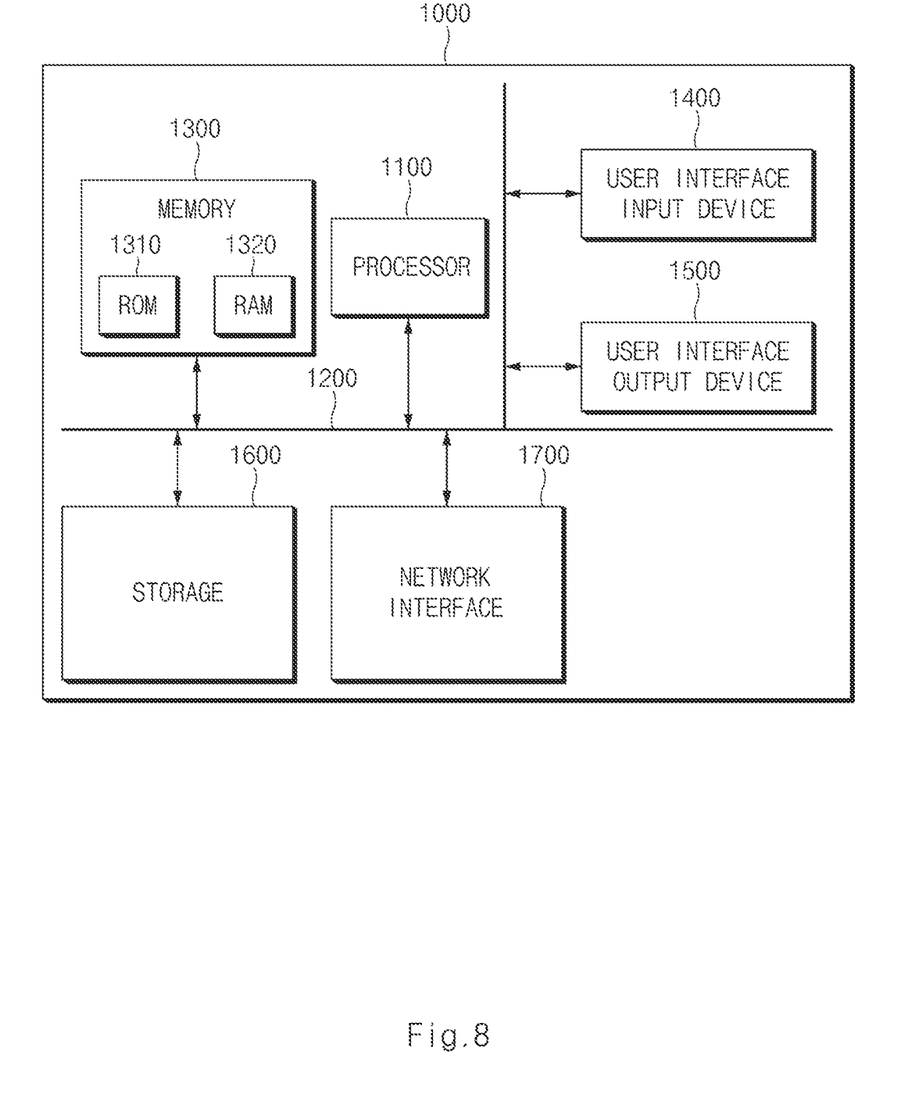
FIG. 8 is a view illustrating a computing system for executing a method according to an exemplary form of the present disclosure.

FIG. 8 is a view illustrating a computing system for executing a method according to another form of the present disclosure.

Referring to FIG. 8, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus and method for controlling driving of a vehicle of the forms of the present disclosure, the driving of the vehicle may be controlled by accurately reflecting external environment information and setting the target driving speed of the vehicle, so that it is possible to minimize or reduce user anxiety about the stability of autonomous driving and reduce the risk of an accident.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed forms of the present disclosure do not limit the technical spirit of the present disclosure but are illustrative, and the scope of the technical spirit of the present disclosure is not limited by the forms of the present disclosure. The scope of the present disclosure should be construed by the claims, and it will be understood that all the technical spirits within the equivalent range fall within the scope of the present disclosure.

What is claimed is:

1. An apparatus for controlling driving of a vehicle, the apparatus comprising:
a sensor configured to obtain external environment information of the vehicle, wherein the obtained external environment information includes weather information and road surface information of a road on which the vehicle is traveling; and
a controller configured to:
set, as a minimum sensing distance detectable by the sensor, a distance to an obstacle located at a maximum distance detectable by the sensor with a probability that is equal to or greater than a specified probability,
calculate a target driving speed based on at least one of the weather information, the road surface information, or the minimum sensing distance detectable by the sensor, wherein the controller is configured to calculate a third target speed based on the minimum sensing distance detectable by the sensor and calculate the target driving speed based at least in part on the third target speed, set a preset driving speed as the target driving speed, and update the target driving speed when an amount of change in the target driving speed is equal to or greater than a specific value, wherein the amount of change in the target driving speed is obtained according to a change of the target driving speed corresponding to a change of at least one of the weather information, the road surface information, or the minimum sensing distance detectable by the sensor.

2. The apparatus of claim 1, wherein the controller is configured to calculate a first target speed based on a preset weather coefficient based on the weather information and the preset driving speed.

3. The apparatus of claim 2, wherein the controller is configured to calculate a required braking distance based on a friction coefficient corresponding to the road surface information, the preset driving speed, and a gravitational acceleration.

4. The apparatus of claim 3, wherein the controller is configured to calculate a second target speed based on the required braking distance when the friction coefficient corresponding to the road surface information is less than a friction coefficient corresponding to previously obtained road surface information.

5. The apparatus of claim 4, wherein the controller is configured to calculate a margin distance based on the minimum sensing distance of the sensor and a preset deceleration.

6. The apparatus of claim 5, wherein the controller is configured to calculate the third target speed based on the margin distance when the minimum sensing distance of the sensor is less than a previously detected minimum sensing distance.

7. The apparatus of claim 6, wherein the controller is configured to calculate a minimum value of the first target speed, the second target speed, and the third target speed as the target driving speed.

8. The apparatus of claim 6, wherein the controller is configured to calculate the target driving speed based on a minimum value of the second target speed and the third target speed.

9. The apparatus of claim 6, wherein the controller is configured to calculate the third target speed as the target driving speed.

10. A method of controlling driving of a vehicle, the method comprising:
obtaining, by a sensor, external environment information of the vehicle, wherein the obtained external environment information includes weather information and road surface information of a road on which the vehicle is traveling;
setting, by a controller, as a minimum sensing distance, a distance to an obstacle located at a maximum distance detectable by the sensor with a probability that is equal to or greater than a specified probability;
calculating, by the controller, a target driving speed based on at least one of the weather information, the road surface information, or the minimum sensing distance detectable by the sensor, wherein calculating the target driving speed includes calculating a third target speed based on the minimum sensing distance and calculating the target driving speed based at least in part on the third target speed;
setting, by the controller, a preset driving speed as the target driving speed; and
updating, by the controller, the target driving speed when an amount of change in the target driving speed is equal to or greater than a specific value, wherein the amount of change in the target driving speed is obtained according to a change of the target driving speed corresponding to a change of at least one of the weather information, the road surface information, or the minimum sensing distance detectable by the sensor.

11. The method of claim 10, wherein calculating the target driving speed includes:
calculating a first target speed based on a preset weather coefficient based on the weather information and the preset driving speed.

12. The method of claim 11, wherein calculating the target driving speed includes:
calculating a required braking distance based on a friction coefficient corresponding to the road surface information, the preset driving speed, and a gravitational acceleration.

13. The method of claim 12, wherein calculating the target driving speed includes:
in response to determining that the friction coefficient corresponding to the road surface information is less than a friction coefficient corresponding to previously obtained road surface information, calculating a second target speed based on the required braking distance.

14. The method of claim 13, wherein calculating the target driving speed includes:
calculating a margin distance based on the minimum sensing distance of the sensor and a preset deceleration.

15. The method of claim 14, wherein calculating the target driving speed includes:
in response to determining that the minimum sensing distance of the sensor is less than a previously detected minimum sensing distance, calculating the third target speed based on the margin distance.

16. The method of claim 15, wherein calculating the target driving speed includes:
calculating a minimum value of the first target speed, the second target speed, and the third target speed as the target driving speed.

17. The method of claim 15, wherein calculating the target driving speed includes:
calculating the target driving speed based on a minimum value of the second target speed and the third target speed.

18. The method of claim 15, wherein calculating the target driving speed includes:
calculating the third target speed as the target driving speed.

* * * * *